No. 811,000. PATENTED JAN. 30, 1906.
V. TOMPKINS.
GASKET.
APPLICATION FILED MAR. 29, 1905.

WITNESSES:
Robert Head
P. B. Cavanagh

INVENTOR
Vreeland Tompkins
BY
Clifford & Phillee
ATTORNEYS.

UNITED STATES PATENT OFFICE.

VREELAND TOMPKINS, OF JERSEY CITY, NEW JERSEY.

GASKET.

No. 811,000.　　　Specification of Letters Patent.　　　Patented Jan. 30, 1906.

Application filed March 29, 1905. Serial No. 252,668.

*To all whom it may concern:*

Be it known that I, VREELAND TOMPKINS, a citizen of the United States, and a resident of Jersey City, in the county of Hudson and State of New Jersey, have invented certain new and useful Improvements in Gaskets, of which the following is a specification.

This invention relates to certain novel and useful improvements in gaskets, and has particular application to an article of the class described adapted to be used in connection with the jointure of pipes.

As is well known, in joining pipes together it is often necessary to insert a gasket between the end flanges of two adjacent pipes, and heretofore considerable difficulty has been experienced in holding the gasket in place while such pipes are being connected with bolts or similar devices. This difficulty has been chiefly due to the fact that the gasket is relatively smaller than the end flanges of the pipes, and when the pipes are being drawn together by tightening up the bolts there has been no means of holding the gasket stationary in its proper position relative to such flanges, the result being that the thin disk is liable to slip or fall out of its proper position. When the gasket is provided with a series of small apertures for the passage of the bolt, this difficulty is not very serious; but when, as is usually the case, the gasket is of such diameter that its periphery or outer edge falls below the line of bolt-holes it is almost impossible to secure the gasket in position without difficulty and the expenditure of considerable time; but in the present invention I have provided an improved gasket having means by which it may be held in proper position relative to the ends of the pipe while such ends are being drawn together by means of the bolts, as aforesaid.

My invention consists in the improved gasket set forth in and falling within the scope of the appended claim.

In the accompanying drawings similar characters of reference indicate like parts in all the views.

Figure 1:
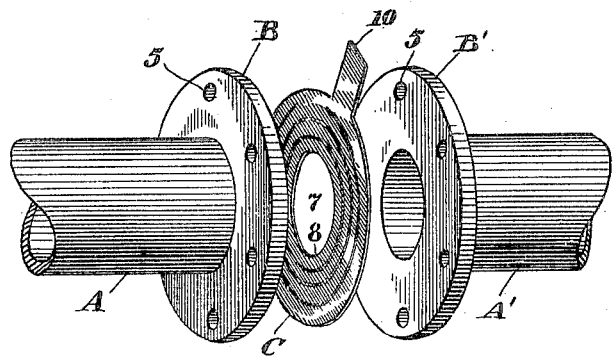
Figure 2:
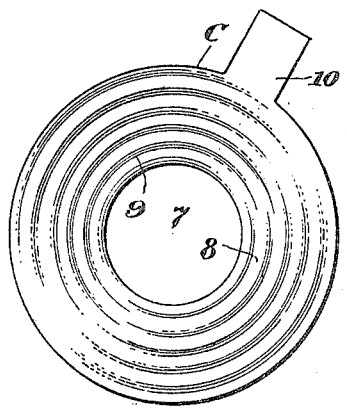
Figure 3:
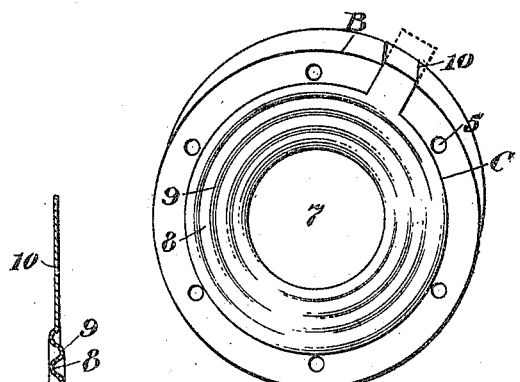
Figure 4:
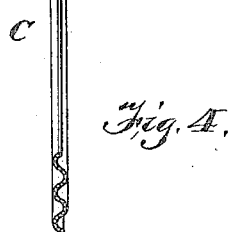

Figure 1 is a perspective view showing the end portions of adjacent pipes to be joined with my improved gasket interposed therebetween. Fig. 2 is a plan view of a gasket of relatively large size embodying the invention. Fig. 3 is a view showing a gasket in position against the end flange of a pipe. Fig. 4 is a sectional view of the gasket.

Referring now to the accompanying drawings in detail, the letters A and A' indicate two pipes to be joined, each of said pipes having end flanges B and B', each of such flanges being provided with bolt-holes 5, arranged at suitable distances apart adjacent to the periphery of the flanges.

My gasket as a whole is indicated by C. As will be seen, this gasket is in the form of a circular disk having a relatively large central opening 7 formed therein approximately of the same diameter as the inner diameter of the pipes, and this gasket is provided with a series of circular grooves 8, forming corrugations 9, so that the face portion of the gasket is corrugated.

The principal feature of this invention is to provide the gasket with means by which it may be held in proper position when the flanges of the pipes are being brought together, and to accomplish this when the gasket is cut or stamped out from the sheet of material I form it with a small flexible radially-extending lug or projection 10, which may be of any desired form or character, but is preferably of rectangular shape, as is shown in the drawings.

When the parts of the pipe are to be assembled and cemented together, the gasket is placed in position, as is shown in Fig. 3, and the operator then bends the flexible lug over at an angle to the gasket proper, so that such gasket is sustained in position by the lug or projection engaging with the flange or end of the pipe, and the ends of the pipe are then brought together by the tightening of the bolts. As the gasket is often smaller in diameter than the distance between opposite bolt-holes of the pipes, as is shown in Fig. 3, the use of such a lug upon the gasket will save considerable time and expense in the work of uniting the pipes. If desired, after the pipes have been connected the exposed portion of the lug or projection may be removed from the gasket.

This form of gasket will be found especially useful when the well-known "Smooth-on" cement is used in joining the ends of the pipe together, for with the aid of such a lug the gasket is held stationary in place without further attention while the cement is uniformly distributed between the pipe-flanges, and if it is necessary to employ more than one gasket, owing to adjacent ends of the pipe not fitting closely and snugly, two or more of the gaskets may be placed face to face with a layer of cement between such faces and connecting the same. By this means the gaskets may be built up until a substantially unitary gasket of sufficient thickness results.

Having thus described my invention, what I desire to secure by Letters Patent is—

An article of the class described comprising a corrugated gasket having a flexible projection formed therewith adapted to extend beyond the heads of the joint to be sealed by said gasket to afford means for holding the gasket stationary during the formation of the joint.

In testimony whereof I have signed my name to this specification in the presence of two subscribing witnesses.

VREELAND TOMPKINS.

Witnesses:
JOHN H. PHAIR,
STEPHEN H. OLIN.